United States Patent [19]

Pasin et al.

[11] Patent Number: 5,669,617
[45] Date of Patent: Sep. 23, 1997

[54] CHILDREN'S STAKE WAGON

[75] Inventors: Antonio James Pasin, Chicago, Ill.; Joseph Gerald Lucey, Franklin, Wis.; Jerry Alan Weber, Sabula, Iowa

[73] Assignee: Radio Flyer, Inc.

[21] Appl. No.: 635,770

[22] Filed: Apr. 22, 1996

Related U.S. Application Data

[63] Continuation-in-part of Ser. No. 489,056, Jun. 9, 1995.

[51] Int. Cl.$^6$ ........................................... B62B 9/00
[52] U.S. Cl. ........................... 280/87.01; 280/87.021; 280/147; 296/43
[58] Field of Search ..................... 296/43; 280/87.01, 280/87.021, 47.34, 47.38, 79.11, 79.2, 143, 147

[56] References Cited

U.S. PATENT DOCUMENTS

| D. 338,925 | 8/1993 | Huystee | D21/78 |
|---|---|---|---|
| 1,535,128 | 4/1925 | Milner | 296/43 |
| 1,632,384 | 6/1927 | Showers | 280/87.01 |
| 1,707,730 | 4/1929 | Kennedy | 296/43 |
| 1,845,092 | 2/1932 | Meininghaus | 296/43 |
| 2,676,054 | 4/1954 | Pasin | 296/43 X |
| 3,116,935 | 1/1964 | Mitchin et al. | 280/87.01 X |
| 4,930,831 | 6/1990 | Valiga et al. | |
| 5,071,185 | 12/1991 | Schiele | 296/43 X |
| 5,360,222 | 11/1994 | Bro et al. | 280/87.021 |
| 5,529,323 | 6/1996 | Braucke et al. | 280/47.34 X |

OTHER PUBLICATIONS

1994 Radio Flyer Inc. product catalog, pp. 14–15 Little Tikes advertisement.

*Primary Examiner*—Robert J. Oberleitner
*Assistant Examiner*—Michael Mar
*Attorney, Agent, or Firm*—Rudnick & Wolfe

[57] ABSTRACT

A children's stake wagon having a horizontally disposed surface for supporting a child in the wagon, and surrounding front, rear and side walls. These walls define openings in their top edges which provide access to pockets formed in the respective walls. Stakes form upwardly extending side, front and rear wall extensions having legs removably received in these pockets. The extensions preferably comprise a plurality of horizontally disposed spaced-apart rail sections. Vertically extending spaced-apart sections include upper portions interconnecting the respective rails and lower portions defining the legs receivable within the pockets. Additional legs have hooked ends receivable within additional pockets to hold the stakes in position on the wagon.

18 Claims, 7 Drawing Sheets

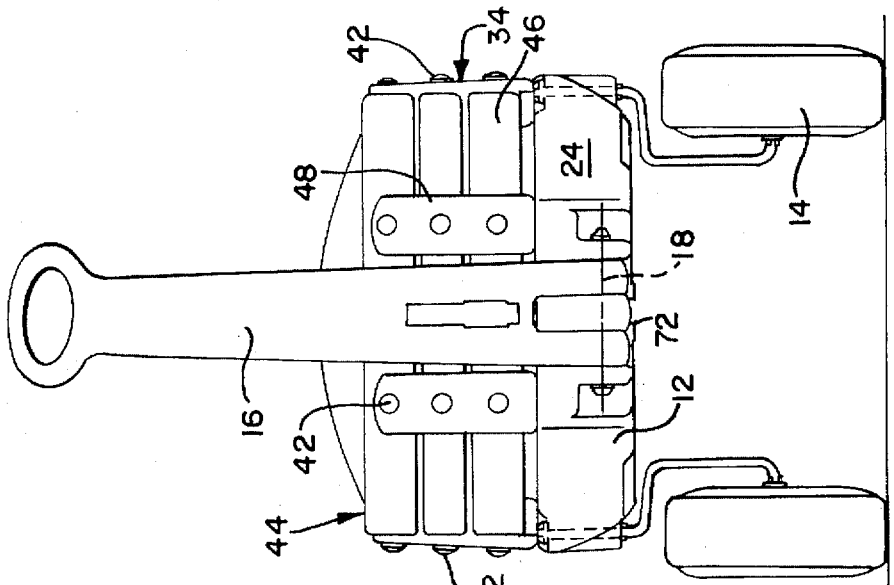
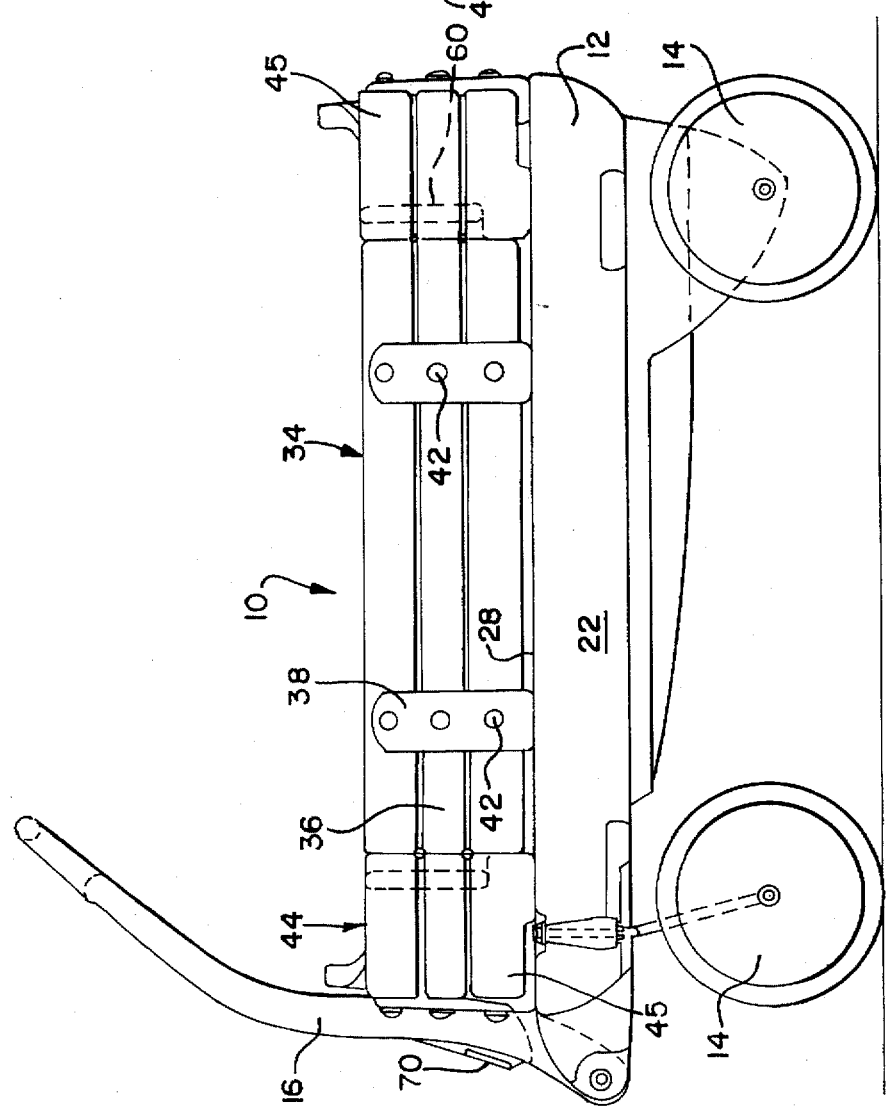

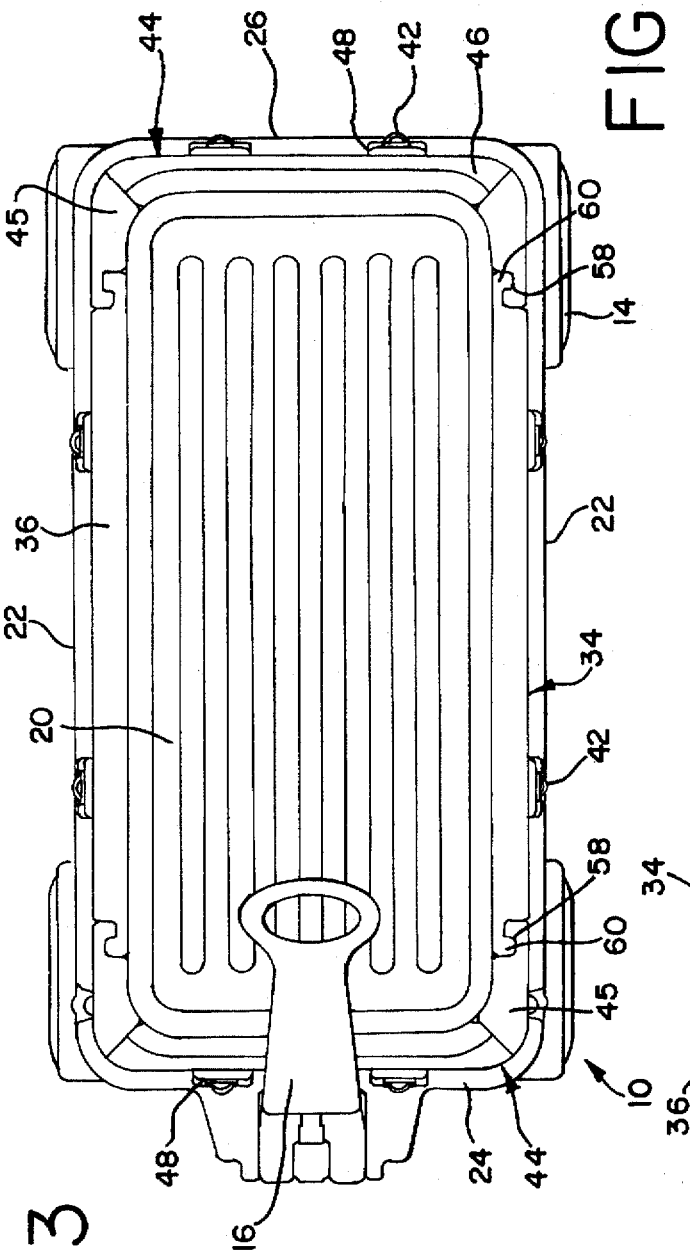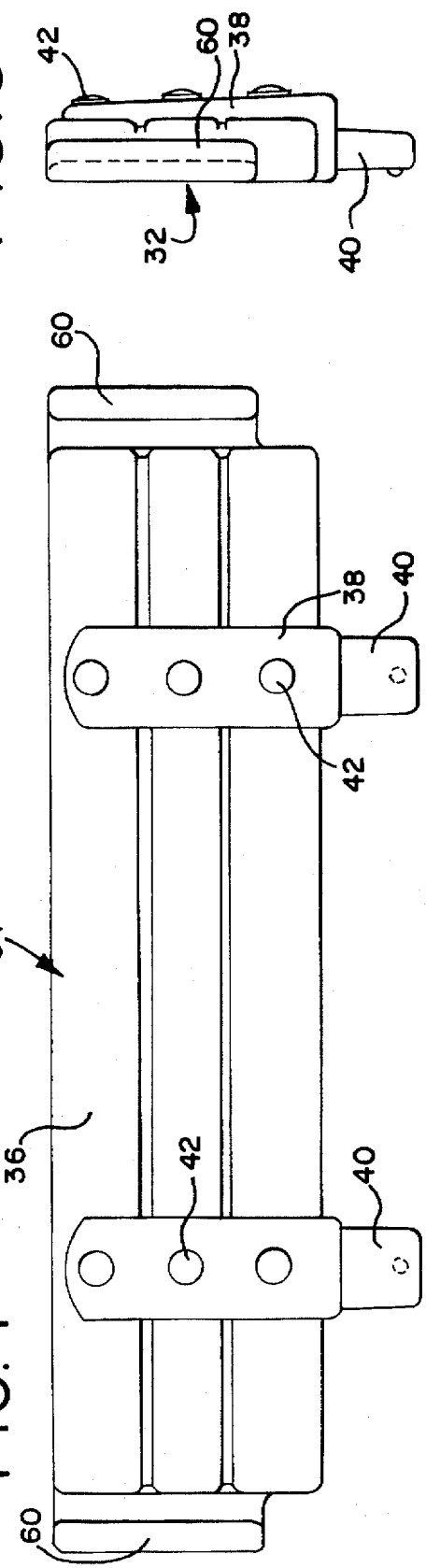

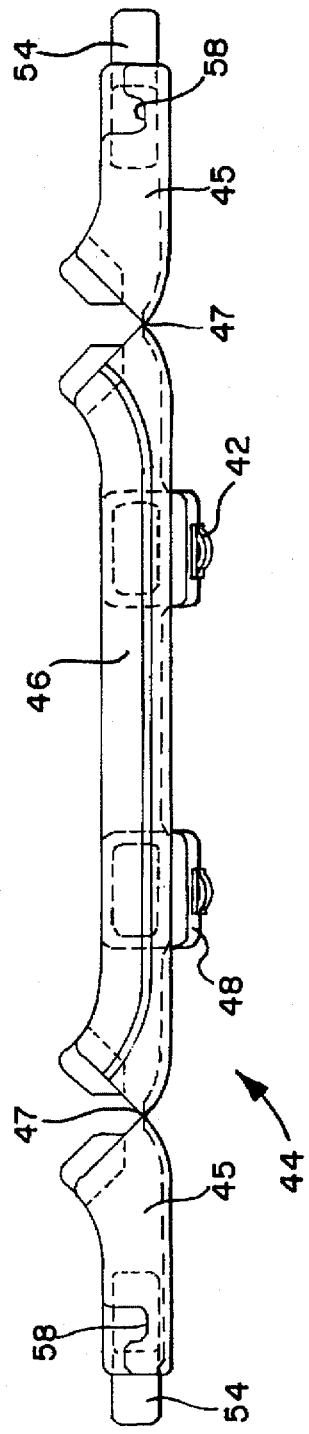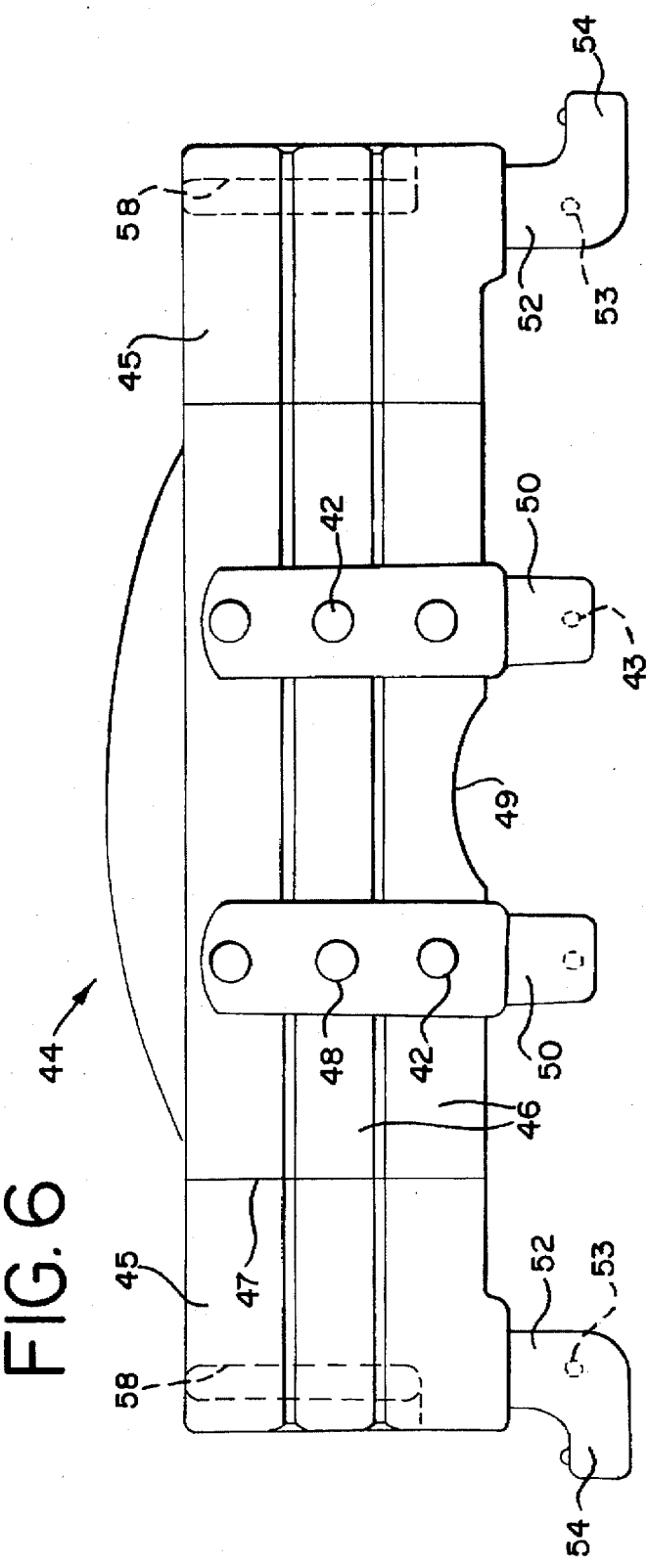

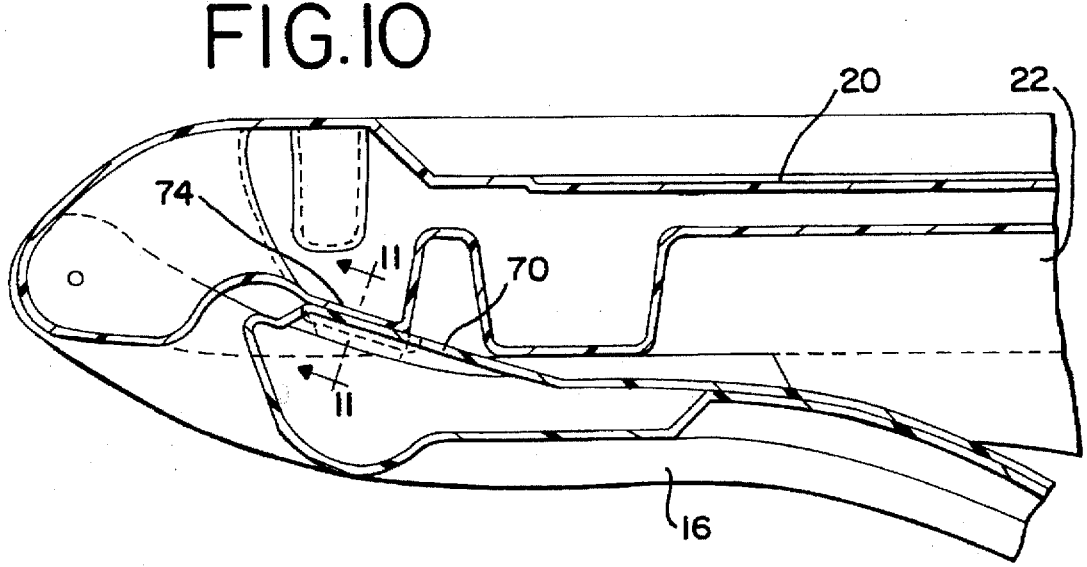
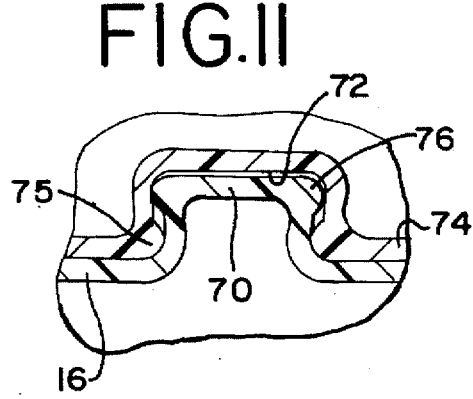
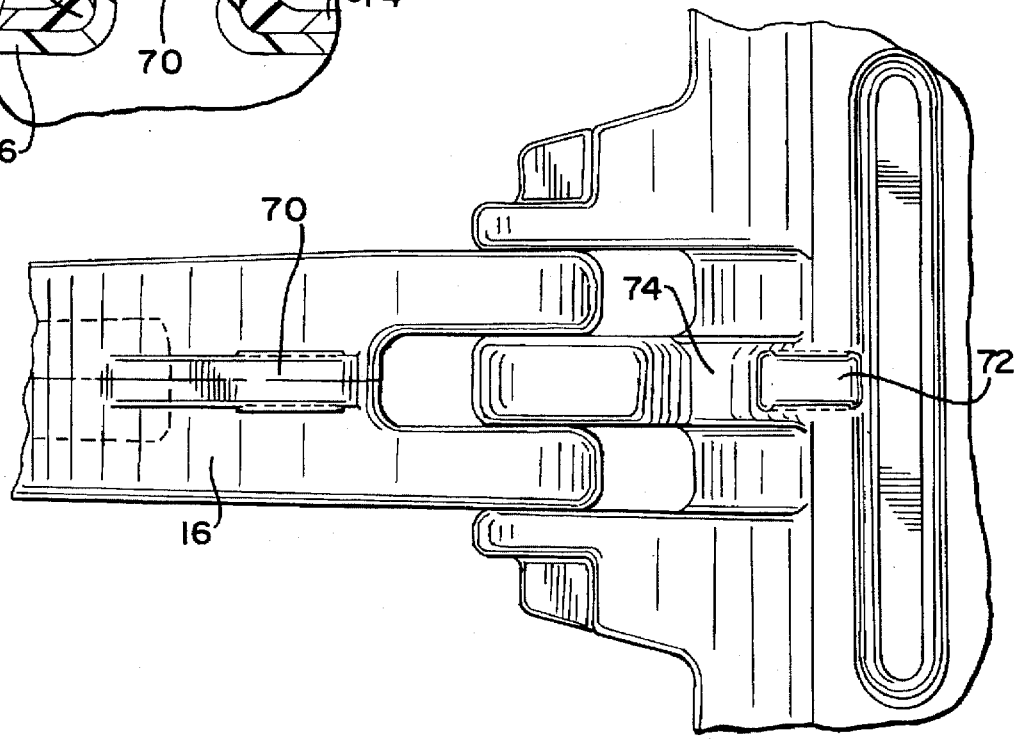

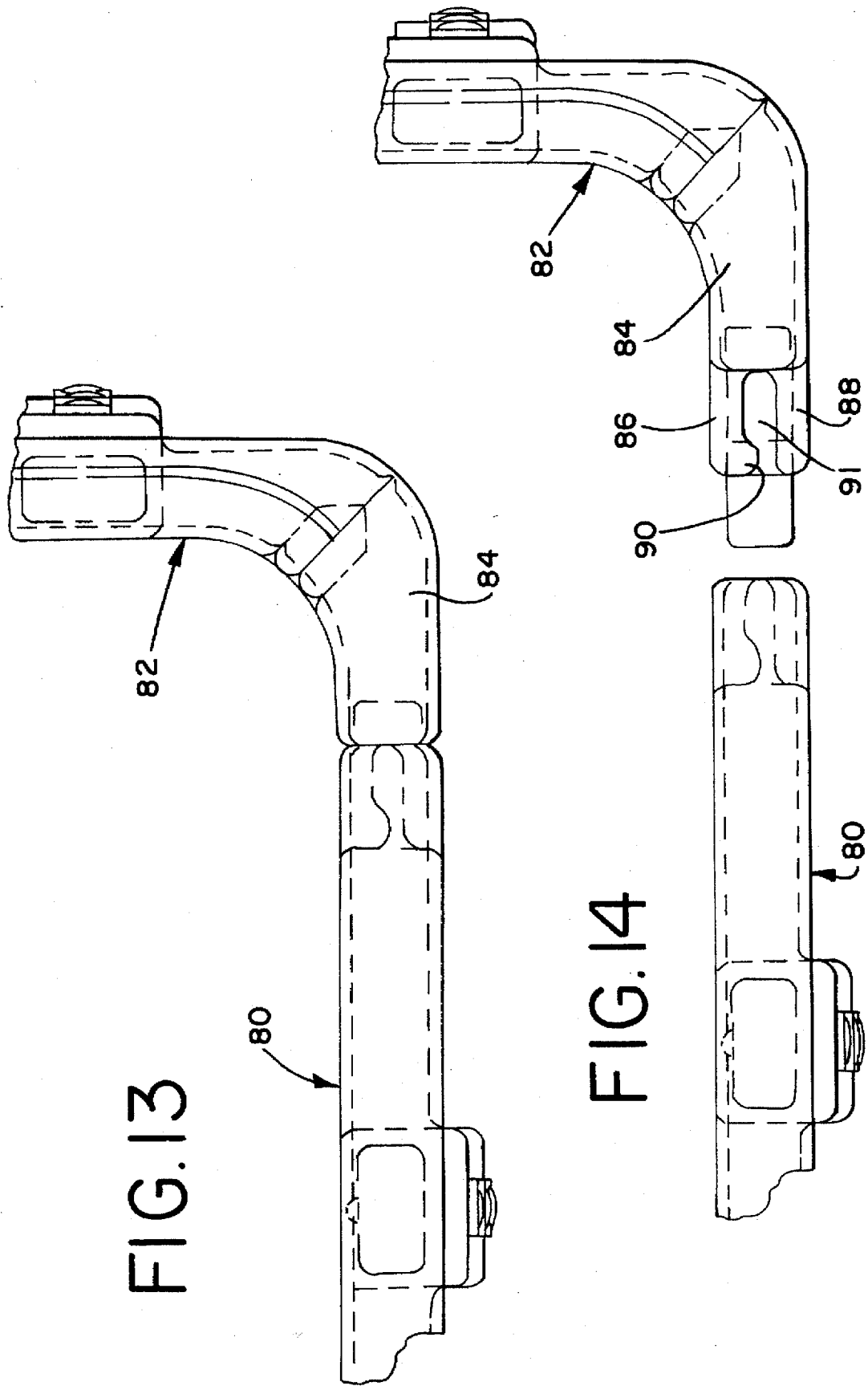

CHILDREN'S STAKE WAGON

This application is a continuation-in-part of application Ser. No. 08-489,056, filed Jun. 9, 1995.

BACKGROUND OF THE INVENTION

This invention relates generally to toy wagons and, in particular, to "stake" wagons, i.e., wagons having rail-like side wall portions. These side wall portions extend upwardly from top edges of the wagon side walls and thereby provide a deeper passenger compartment for a child riding in the wagon.

A standard children's wagon generally consists of a wagon body having a horizontally disposed surface for supporting a child, and upstanding front, rear and side walls formed around the periphery of this surface. The wagon body consisting of these horizontal and vertical walls is supported on wheels and a handle is usually provided for pulling and steering purposes.

In the past, the wagon bodies have been formed of wood, metal or combinations thereof. Among various wagon designs are those with upwardly extending wall sections attached to the walls of the wagon body. U.S. Pat. No. 4,930,831 illustrates one arrangement for providing such additional wall sections. These upstanding wall sections are attached to the walls of the wagon body by means of nuts and bolts, and the arrangement provides a more or less permanent combination. With this design, a deeper passenger compartment is achieved which can be beneficial when the wagon is used by small children or for using the wagon to carry additional loads.

Another version of wagons with additional wall portions comprises a "stake" wagon of the type manufactured by Radio Flyer Inc. These may comprise a wagon body of metal or wood, and the upward wall extensions consist of interconnected and spaced-apart wooden or plastic horizontal rails. Vertical attaching members or stakes are utilized for holding the horizontal rails in assembly and for providing means for attaching the wall extensions to the wagon body.

Recently, children's wagon bodies have been made from molded plastic, such as from a high density polyethylene or some similar material. This material may be utilized for forming wagon bodies of strong but light-weight construction. Improvements in upward wall extensions for wagon bodies are always desirable including upward wall extensions particularly suited for molded plastic wagon bodies.

BRIEF DESCRIPTION OF THE INVENTION

The children's wagon of this invention comprises a generally standard wagon body including a horizontally disposed supporting surface with front, rear and side walls at the perimeter of the surface. The walls define top edges and pockets extending downwardly from the top edges are formed in the walls.

Upward extensions for the walls in the form of stakes are designed for removable mounting on the top edges. These stakes include downwardly extending leg portions which are received within the pockets formed in the walls.

At least some of the stakes also define legs with hooked ends. Complementary pockets are formed in the wagon walls to receive these ends and to thereby secure these stakes in place. Stakes are designed for placement along the side walls and complementary stakes are designed for securing in place over the front and rear walls. Interlocking means are defined at the ends of the respective stakes to achieve a secure assembly of the stakes while also permitting removal to allow for use without the stakes and to also simplify storage and transportation.

The combination of this invention preferably includes stakes for the front and rear walls which have hinged end sections permitting the stakes to be shaped for interlocking with the side stakes. In addition, the hinged arrangement allows the font and rear stakes to be flattened out for achieving a very compact assembly for packaging and shipping by the manufacturer, and this feature contributes to ease of storage and transportation after the initial assembly of the product. Furthermore, it has been found that the hinged arrangement permits blow molding of these parts which results in substantial savings of manufacturing cost.

In this same regard, the handle for the wagon is designed to be pivoted underneath the wagon and locked in place. This, along with the other features described, provides a very compact unit which is desirable, for example, when one wishes to transport the wagon in the trunk of the car.

The invention is particularly suited for use in association with wagon bodies comprising a one-piece molded construction. Thus, the pockets for the legs of the stakes can be molded into the wagon bodywalls. It is also preferred that the stakes be formed of molded plastic, and the legs including those with hooked ends can be conveniently molded during formation of the stakes.

DESCRIPTION OF THE DRAWINGS

FIG. 1 is a side elevational view of a children's stake wagon characterized by the features of this invention;

FIG. 2 is a front elevational view of the wagon shown in FIG. 1;

FIG. 3 is a top plan view of the wagon;

FIG. 4 is an elevational view of a side stake used in the wagon;

FIG. 5 is an end elevational view of the side stake of FIG. 4;

FIG. 6 is an elevational view of a stake of the type mounted at the front and rear of the wagon;

FIG. 7 is a top plan elevational view of the stake of FIG. 6;

FIG. 10 is an enlarged fragmentary cross-sectional view illustrating interlocking of the wagon handle and wagon body;

FIG. 11 is a fragmentary cross-sectional view taken about the line 11—11 of FIG. 10;

FIG. 12 is a fragmentary bottom plan view of the handle and wagon structure of FIG. 10 shown in the open position;

FIG. 13 is a fragmentary top plan view of an alternative form of side stakes and front and rear stakes;

FIG. 14 is a fragmentary top plan view of the stakes of FIG. 13 in a separated state;

DETAILED DESCRIPTION OF THE INVENTION

Figure 8:
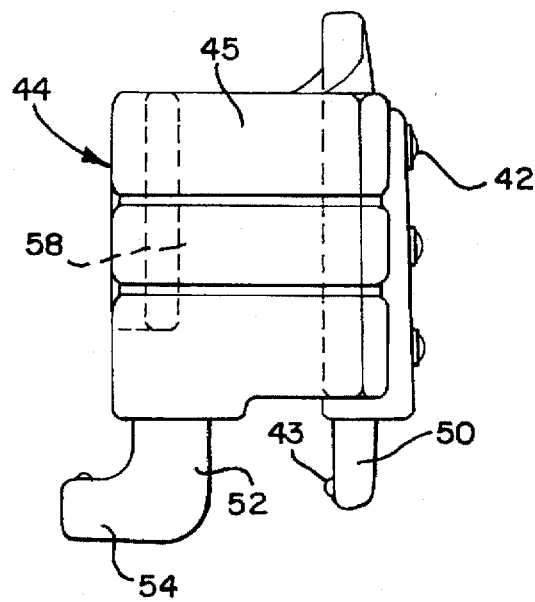
FIG. 8 is a side elevational view of the stake of FIG. 6 with the end portions thereof folded inwardly.

The children's stake wagon 10 shown in FIGS. 1–3 comprises a wagon body 12, front and rear wheels 14, and a pulling and steering handle 16. The handle 16 is pivotally connected to the wagon through use of rod 18. As illustrated in dotted lines in FIG. 1, and as will be explained in greater detail, the handle 16 may be folded under the wagon and locked in place to simplify storage. In that regard, the stakes, to be described, can be removed and packaged and stored in a flat condition for achieving a more compact condition.

The wagon body 12 consists of the horizontally disposed supporting surface 20 with side walls 22, front wall 24 and rear wall 26 surrounding the surface 20. In the preferred form of the invention, the wagon body 12 is formed of molded plastic, and the upstanding walls are relatively thick so that the top surfaces 28 defined by the wagon wall portions are relatively wide. The walls may extend only in the order of one inch upwardly beyond the surface 20 so that only a shallow recessed area is defined within the walls.

Figure 9:
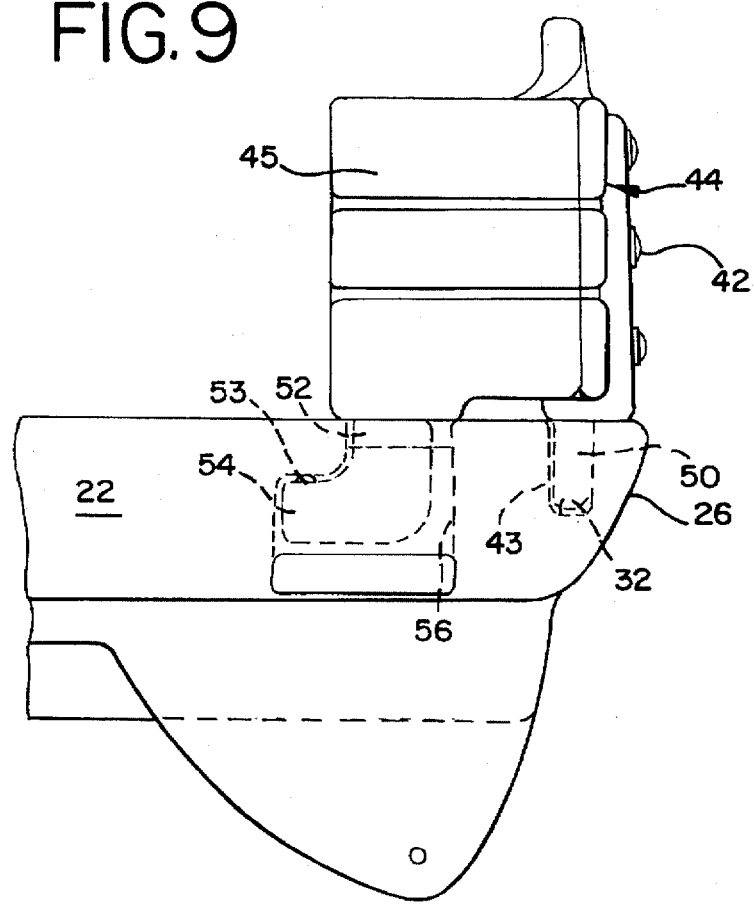
FIG. 9 is an enlarged fragmentary view of the stake of FIG. 6 in association with the wagon.
Figure 15:
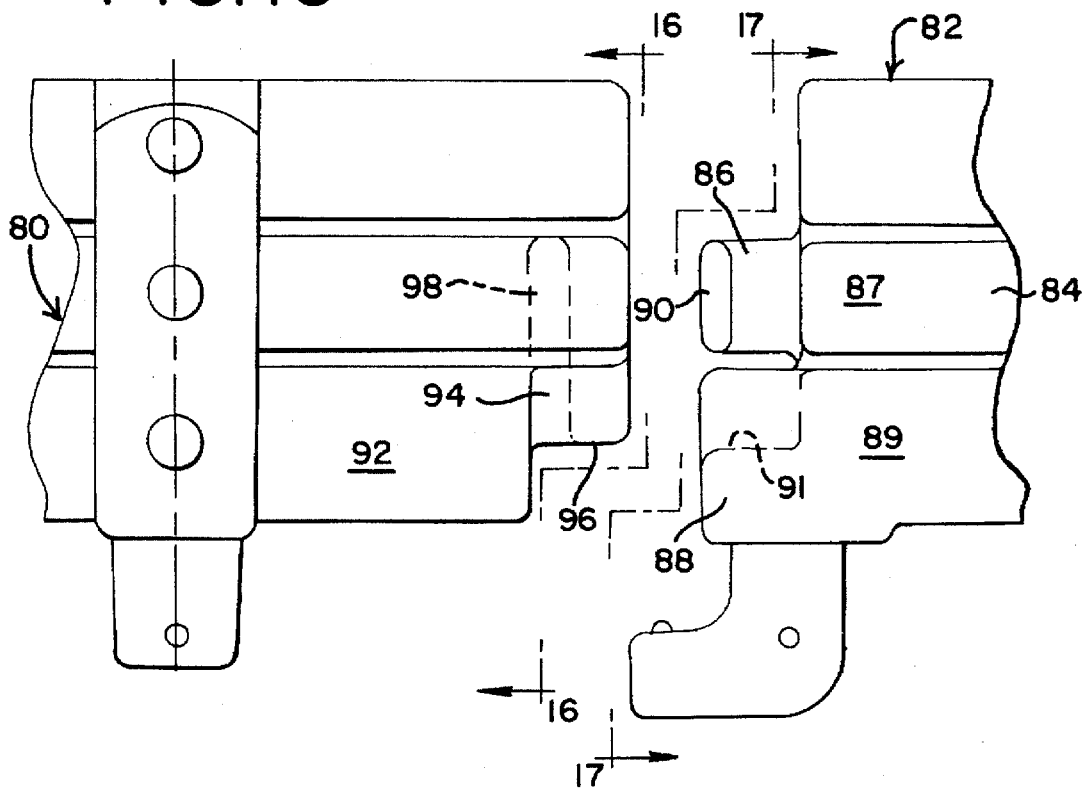
FIG. 15 is a fragmentary side elevational view of the stakes of FIG. 14.
Figure 16:
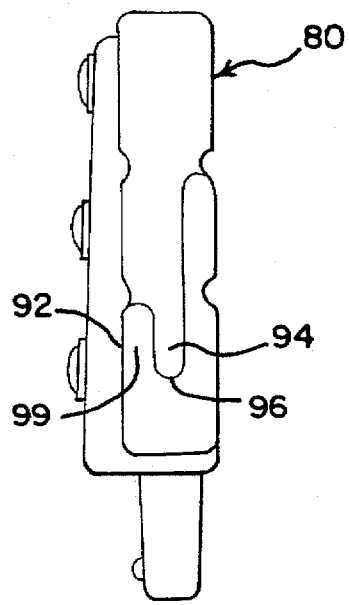
FIG. 16 is an end elevational view taken about the line 16—16 of FIG. 15.
Figure 17:
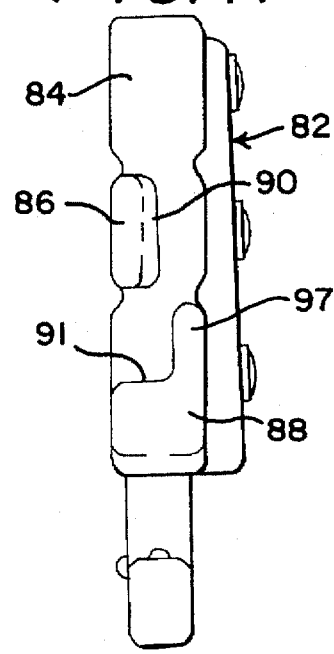
FIG. 17 is an end elevational view taken about the line 17—17 of FIG. 15.

A plurality of openings are defined by the top edges 28. These openings extend downwardly into the respective walls 22, 24 and 26 to form pockets 32 (FIG. 9).

FIGS. 4 and 5 illustrate a stake 34 adapted to form upward extensions for the side walls 22 of the body 12 of the wagon. Each stake consists of horizontal rail portions 36 and vertical legs 38. Each leg also defines a lower end portion 40 receivable within a pocket 32. A hub 43 is formed on the inwardly facing side of each end portion 40 to provide a friction fit of these end portions with a pocket 32 without unduly inhibiting removal of the stakes.

Fasteners positioned as shown at 42 may be employed to hold the rail portions 36 and vertical legs 38 in assembly, however, it is preferred that the stake 34 comprises a one-piece molded part with the fasteners simply being simulated at locations 42. High density polyethylene is an example of a suitable material for forming the stakes of this invention in this fashion and the same material may be employed for forming the wagon body.

Particularly where plastic material is employed, the molded legs and pockets may be dimensioned so that a snug fit is achieved in lieu of the hubs 43 or to augment these elements. The stakes 34 will remain in place due to gravity but such a snug fit will lend stability to the structure and still permit removal when it is desired to use the wagon with less than all of the stakes in place.

FIGS. 6 through 8 illustrate a stake 44 suitable for use at the front and rear of the wagon to form upward extensions for the body 12. This stake also includes horizontal rail portions 46 and vertical legs 48. The latter define lower end portions 50 receivable within pockets 32 formed in the front and rear walls. The bottommost horizontal rail of both the front and rear stakes defines handhold 49 which simplifies lifting of the assembled wagon.

The stake 44 also includes end portions 45 which are connected by means of living hinges 47. When these end portions are folded inwardly, they extend over the top surfaces of the side walls 22. When in the flat condition, these stakes are more easily packaged and stored.

The provision of the living hinges also permits molding of the central portion 46 and end portions 45 while these parts are oriented as shown in FIG. 7. Accordingly, a blow molding process may be used which results in substantial savings in manufacturing cost.

Separate downwardly depending legs 52 having hooked ends 54 are formed integrally with these end portions 45. Additional pockets 56 (FIG. 9) are formed in the side walls 22 on both sides of the wagon and at locations adjacent the front and rear of the wagon.

As best shown in FIG. 9, the hooked ends 54 can be inserted into pockets 56 by moving the ends downwardly into the pockets while the stakes 44 are in a tilted position. The stakes are then pivoted which brings the lower end portions 50 into position within the pockets 32. Nubs 53 formed on the hooked ends 54 may be used to provide a tighter fit within the pockets 56.

The end portions 45 of stakes 44 also define vertical recesses 58 which are dimensioned to receive tangs 60 formed at each end of the side stakes 34. As best shown in FIG. 3, interfitting of the tangs 60 in recesses 58 assists in holding the stakes 34 and 44 in assembly. Furthermore, the recess and tang arrangement allows the side stakes to be slid up and down whereby the side stakes can be selectively removed which increases the enjoyment of the wagon.

FIGS. 10-12 illustrate in detail the manner in which handle 16 can be locked in position beneath the wagon in the manner shown in FIG. 1. As shown, the handle defines an elongated projection 70 which is dimensioned to be received within the recess 72 defined by the bottom wall portion 74 of the wagon. This recess includes inward protrusions 75, and the handle projection includes outward protrusions 76 to insure a tight locking relationship when fit together without requiring undue effort when separating these parts. In addition to providing a very desirable compact unit when storing the wagon in a car trunk or other location, the handle will not be free to swing and cause injury when the wagon is being lifted.

FIGS. 13-17 illustrate an alternative form of side stakes 80 and front and back stakes 82 with different interlocking means. Specifically, the stakes 82 include hinged end portions 84 having an upper interlocking extension 86 extending from the middle rail 87 (FIG. 15) and a lower interlocking extension 88 extending from the lower rail 89 (FIG. 15) on the outside thereof. The upper extension is formed on the inside of the stake and has an outwardly projecting vertical bead 90 formed thereon. The lower extension 88 defines a horizontal shelf 91.

The ends of the side stakes 80 each define a recessed area for receiving the extensions 86 and 88 of the stakes 82. Specifically, the lower rail 92 of the stake 80 has a lip 94 extending outwardly from each end. When the section 84 of stake 82 is mated to this end, the bottom surface 96 of this lip seats on shelf 91 and the wall portion 97 of the extension 88 is received in the opening 99 behind the lip 94.

A recessed area including groove 98 is formed on the inside of a stake 80 at each end thereof. When a stake section 82 is mated to the end of a stake 80, the upper extension 86 thereof will fit within this recessed area with the vertical bead 90 received within groove 98.

The arrangement of FIGS. 13-17 constitutes a significant improvement in the assembly from the standpoint of stability during use. Thus, it will be noted that the stakes 80 are supported against movement due to the application of lateral force in either direction, that is either when a force is applied by a child from within the wagon, or when a force is applied against the outside of a stake 80.

The side stakes 80 are attached by being moved downwardly relative to stakes 82 until the respective top rails are in alignment. The wagon appearance is also improved since, as shown in FIG. 13, the top rails of the stakes 80 and 82 mate in a straight line relationship.

It will be understood that various changes and modifications may be made in the wagon described without departing from the spirit of the invention particularly as defined in the following claims.

That which is claimed is:

1. A children's wagon comprising a horizontally disposed supporting surface and front, rear and side walls at the perimeter of said surface, said walls defining top edges, openings defined by said walls extending downwardly from said top edges to form pockets within said walls, and stakes forming upwardly extending extensions for said walls removably mounted on said top edges, said stakes including downwardly extending legs receivable within said pockets, said stakes comprising four stakes including a stake positioned at the front and rear of the wagon and a side stake positioned at each side of the wagon, vertically disposed opposite ends defined by each stake, and interlocking means for connecting the ends of the stakes at the front and rear of the wagon with the adjacent ends of stakes at the sides of the wagon, said interlocking means including an upper extension and a lower extension formed on one stake end and a lip formed on an adjacent stake end receivable between said extensions whereby lateral forces applied to the lip are resisted by one of said upper and lower extensions.

2. A wagon according to claim 1 wherein said stakes comprise a plurality of horizontally disposed, spaced-apart rails, said legs including vertically extending spaced-apart upper portions interconnecting the respective rails, and wherein said extensions and lip are formed on lowermost ones of said horizontally disposed rails with the ends of the uppermost rails of adjacent side and front and rear stakes defining a straight line abutting relationship upon connecting of the stake ends.

3. A wagon according to claim 1 wherein said upper extension defines an outer vertically extending bead, and a vertically extending groove defined by said adjacent end for receiving said bead.

4. A wagon according to claim 3 herein said extensions are formed in the ends of each of said front and rear stakes, and said lip and groove are formed in each end of each of said side stakes.

5. A children's riding vehicle comprising a supporting surface, openings defined adjacent at least some perimeter portions of said surface, means forming pockets extending downwardly from said openings, upwardly extending stakes removably mounted on said surface, said stakes including downwardly extending legs receivable within said pockets for securing said stakes in place relative to said surface, at least some of said stakes comprising one-piece molded plastic parts including a first portion and at least one end portion pivotally attached to the first portion, said end portion being pivoted into a position approximately perpendicular to the first portion when a stake is mounted on said vehicle, and said end portion being adapted for pivoting into a substantially horizontal position when the stake is separated from said vehicle for packaging and storage, a living hinge being formed between said first portion and said end portion to achieve the pivotal attachment, at least one of said stakes including an integrally molded L-shaped leg having a hooked end, and at least one of said pockets being shaped to receive said hooked end to thereby assist in holding said at least one of said stakes in place relative to said surface.

6. A vehicle according to claim 5 including walls formed around the periphery of said supporting surface, said pockets being defined by said walls whereby said stakes extend upwardly from said walls.

7. A vehicle according to claim 5 wherein said first portion of a stake comprises a central portion, and an end portion attached by means of a said living hinge at each end of said central portion.

8. A vehicle according to claim 7 wherein said stakes comprise a plurality of horizontally disposed, spaced-apart rails, said legs including vertically extending spaced-apart upper portions interconnecting the respective rails.

9. A vehicle according to claim 5 wherein separate stakes are positioned at the front and rear of the vehicle, each of said separate stakes having two additional legs with hooked ends, one at each side of the stake, and pockets shaped to receive the respective hooked ends positioned on opposite sides of the vehicle at the front and rear thereof.

10. A vehicle according to claim 9 wherein each of the stakes positioned at the front and rear defines a vertical recess on the opposite sides thereof, and each of the stakes positioned at the sides of the wagon defines a vertical tang at each end thereof receivable within one of said vertical recesses.

11. A vehicle according to claim 10 including an additional leg located at each side of the stakes positioned at the front and rear of the vehicle, each additional leg having a hooked end, and pockets shaped to receive the respective hooked ends to assist in holding said stakes in place relative to said surface.

12. A vehicle according to claim 11 wherein the stakes positioned at the front and rear of the vehicle define ends extending inwardly over the top edges of the side walls, said hooked ends being received in pockets defined by the side walls.

13. A vehicle according to claim 15 including a handle pivotally attached at the front of the vehicle and wheels mounted at the sides of the vehicle, said handle being pivotable from a location extending over said supporting surface to a position beneath the supporting surface and between said wheel, and including interlocking means defined by said handle and by said wagon body for holding the handle in position beneath the supporting surface.

14. A children's riding vehicle comprising a supporting surface, openings defined adjacent at least some perimeter portions of said surface, means forming pockets extending downwardly from said openings, upwardly extending stakes removably mounted on said surface, said stakes including downwardly extending legs receivable within said pockets for securing said stakes in place relative to said surface, said stakes comprising four stakes including a stake positioned at the front and rear of the vehicle and a side stake positioned at each side of the vehicle, vertically disposed opposite ends defined by each side of the vehicle, vertically disposed opposite ends defined by each stake, and interlocking means for connecting the ends of the stakes at the front and rear of the vehicle with the adjacent ends of stakes at the sides of the vehicle, said interlocking means including an upper extension and a lower extension formed on one stake end and a lip formed on an adjacent stake end receivable between said extensions whereby lateral forces applied to the lip are resisted by one of said upper and lower extensions.

15. A vehicle according to claim 14 wherein said stakes comprise a plurality of horizontally disposed, spaced-apart rails, said legs including vertically extending spaced-apart upper portions interconnecting the respective rails, and wherein said extensions and lip are formed on lowermost ones of said horizontally disposed rails with the ends of the uppermost rails of adjacent side and front and rear stakes defining a straight line abutting relationship upon connecting of the stake ends.

16. A vehicle according to claim 14 wherein said upper extension defines an outer vertically extending bead, and a vertically extending groove defined by said adjacent end for receiving said bead.

17. A vehicle according to claim 16 wherein said extensions are formed in the ends of each of said front and rear stakes, and said lip and groove are formed in each end of each of said side stakes.

18. A children's riding vehicle comprising a supporting surface, openings defined adjacent at least some perimeter portions of said surface, means forming pockets extending downwardly from said openings, upwardly extending stakes removably mounted on said surface, said stakes including downwardly extending legs receivable within said pockets for securing said stakes in place relative to said surface, at least some of said stakes comprising one-piece molded plastic parts including a first portion and at least one end portion pivotally attached to the first portion, said end portion being pivoted into a position approximately perpendicular to the first portion when a stake is mounted on said vehicle, and said end portion being adapted for pivoting into a substantially horizontal position when the stake is separated from said vehicle for packaging and storage, a living hinge being formed between said first portion and said end portion to achieve the pivotal attachment, said stakes including front, rear, and side stakes positioned at the front, rear, and sides of the vehicle, each of said front and rear stakes having a vertical recess formed on opposite sides thereof and each of said side stakes having a vertical tang at each end thereof receivable within one of said vertical recesses.

* * * * *